United States Patent
Zhu et al.

(10) Patent No.: US 9,557,526 B2
(45) Date of Patent: Jan. 31, 2017

(54) FREEFORM IMAGING LENS AND FREEFORM IMAGING SYSTEM USING THE SAME

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 97 days.

(21) Appl. No.: 14/521,222

(22) Filed: Oct. 22, 2014

(65) Prior Publication Data

US 2015/0116842 A1 Apr. 30, 2015

(30) Foreign Application Priority Data

Oct. 24, 2013 (CN) .......................... 2013 1 0503691

(51) Int. Cl.
*G02B 3/00* (2006.01)
*G02B 13/00* (2006.01)
*G02B 3/02* (2006.01)
*G02B 26/12* (2006.01)

(52) U.S. Cl.
CPC ............. *G02B 13/0005* (2013.01); *G02B 3/02* (2013.01); *G02B 26/125* (2013.01)

(58) Field of Classification Search
CPC .................................................. G02B 13/0005
USPC .......................................................... 359/662
See application file for complete search history.

(56) References Cited

U.S. PATENT DOCUMENTS

2009/0052050 A1* 2/2009 Kweon .................. G02B 13/06
359/668

* cited by examiner

*Primary Examiner* — James Jones
(74) *Attorney, Agent, or Firm* — Zhigang Ma

(57) ABSTRACT

A freeform imaging lens defined in a (x, y, z) coordinate is provided. The freeform imaging lens comprises a first surface and a second surface opposite to the first surface. The first surface comprises a first freeform surface and a second freeform surface symmetrical about x-z plane. The first freeform surface and the second freeform surface are $5^{th}$ order xy-polynomial curve surfaces. The second surface is a $10^{th}$ order aspheric surface. The present disclosure also relates to a freeform imaging system using the above freeform imaging lens.

16 Claims, 8 Drawing Sheets

US 9,557,526 B2

FREEFORM IMAGING LENS AND FREEFORM IMAGING SYSTEM USING THE SAME

CROSS-REFERENCE TO RELATED APPLICATIONS

This application claims all benefits accruing under 35 U.S.C. §119 from China Patent Application No. 201310503691.2, filed on Oct. 24, 2013 in the China Intellectual Property Office, disclosure of which is incorporated herein by reference.

BACKGROUND

1. Technical Field

The present disclosure relates to a freeform imaging lens and a freeform imaging system using the same.

2. Description of Related Art

Compared with conventional rotationally symmetric surfaces, freeform optical surfaces have higher degrees of freedom, which can reduce the aberrations and simplify the structure of the system in optical design. In recent years, with the development of advancing manufacture technologies, freeform surfaces have been successfully used in the imaging field, such as head-mounted-displays, reflective systems, varifocal panoramic optical systems and microlens arrays.

In some related art, the freeform imaging systems cannot provide a superior performance in imaging, and requires multi-mirrors which makes it hard to be assembled.

What is needed, therefore, is to provide a freeform imaging system, in which the freeform imaging system can provide a superior performance in imaging, and can be easily assembled.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the freeform imaging system.

Figure 1:
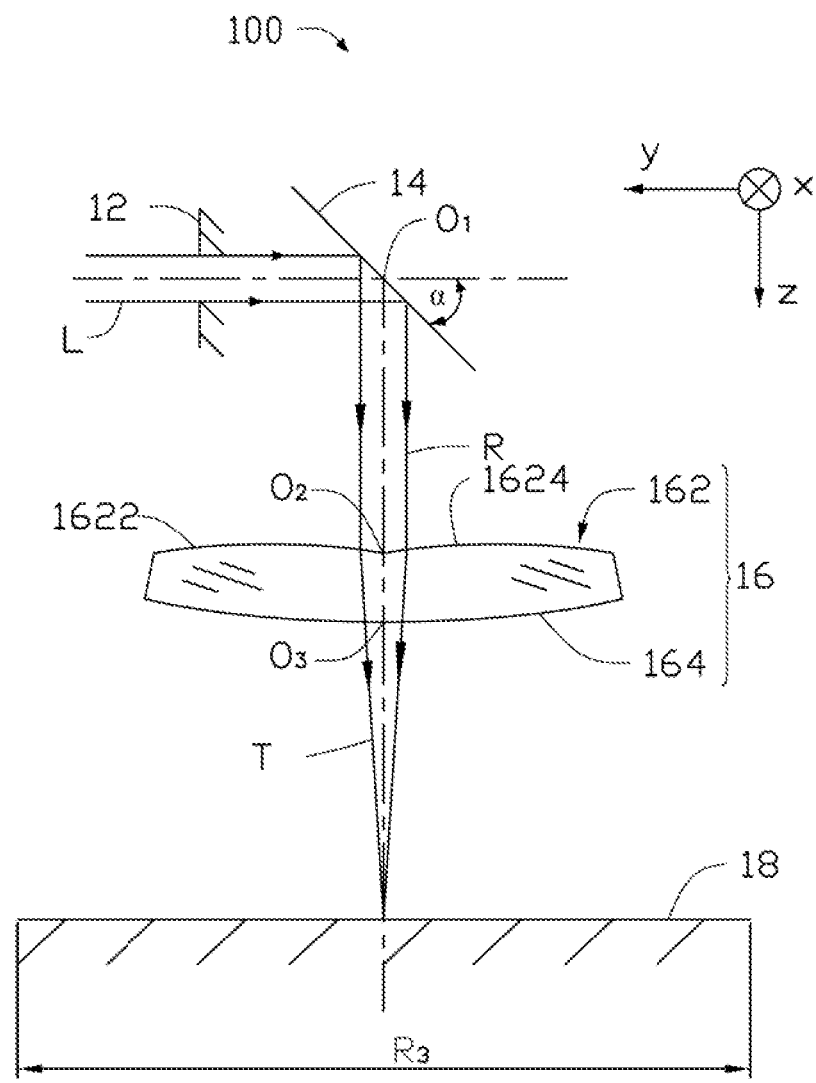
FIG. 1 shows a schematic structural view of one embodiment of a freeform imaging system.

Referring to FIG. 1, a freeform imaging system 100 of one embodiment comprises: a light source (not show), an entrance pupil 12, a reflector 14, a freeform imaging lens 16 and an image sensing element 18. The freeform imaging system 100 is defined in a (x, y, z) coordinate.

The light source outputs a laser L along the y-axis. A width of the laser L can be greater than 3 millimeters, and a wavelength of the laser L is not limited. In one embodiment, the laser L is an infrared laser with the wavelength of about 780 nm and the width of about 3 millimeters.

The entrance pupil 12 is located on a light path of the laser L and blocks excess laser L. A diameter of the entrance pupil 12 can be chosen according to different embodiments. In one embodiment, the diameter of the entrance pupil 12 is about 3 millimeters.

The reflector 14 is located on a side of the entrance pupil 12 opposite to the light source, and perpendicular to a y-z plane. The reflector 14 reflects the laser L to form a reflected light R in the y-z plane. The reflector 14 has a center $O_1$ and is capable of revolving around the center $O_1$. An angle α can be formed between the reflector 14 and the y-axis. The angle α can be in a range from about 15 degrees to about 75 degrees.

Figure 2:
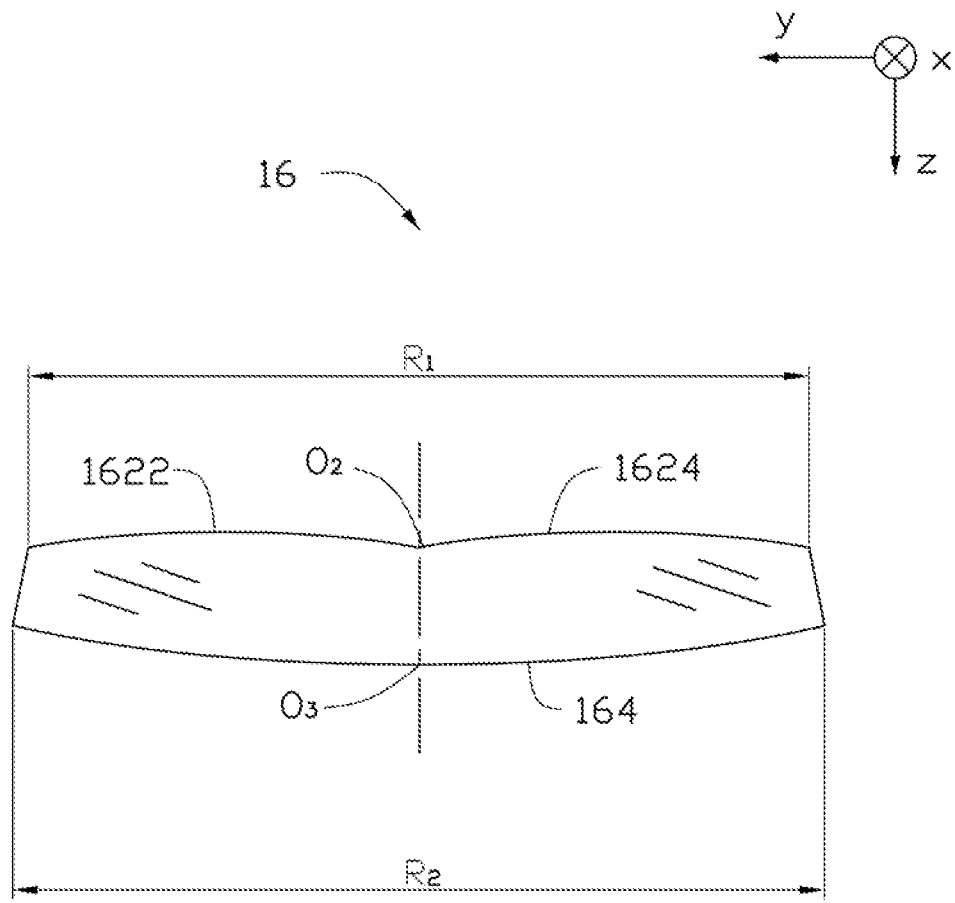
FIG. 2 shows a schematic structural view of one embodiment of a freeform lens of the freeform imaging system of FIG. 1.

The freeform imaging lens 16 is an f-θ lens, and is located on a light path of the reflected light R. The reflected light R is refracted by the freeform imaging lens 16 to form a refracted light T. Referring to FIG. 2, the freeform imaging lens 16 comprises a front surface 162 and a back surface 164 opposite to the front surface 162. An effective clear aperture $R_1$ of the front surface 162 along the y-axis can be greater than 154.82 millimeters. In one embodiment, the effective clear aperture $R_1$ of the front surface 162 along the y-axis is about 154.82 millimeters. An effective clear aperture $R_2$ of the back surface 164 along the y-axis can be greater than 163.39 millimeters. In one embodiment, the effective clear aperture $R_2$ of the back surface 164 along the y-axis is about 163.39 millimeters.

The front surface 162 comprises a first freeform surface 1622 and a second freeform surface 1624. The first freeform surface 1622 and the second freeform surface 1624 are symmetrical about x-z plane. The front surface 162 has a center $O_2$. The back surface 164 has a center $O_3$. A distance between the center $O_1$ and the center $O_2$ along the y-axis is about 42.29 millimeters. A distance between the center $O_2$ and the center $O_3$ along the y-axis is about 44.69 millimeters. A material of the freeform imaging lens 16 is not limited. In one embodiment, the material of the freeform imaging lens 16 is PMMA with a refractive index of about 1.4917 and an Abbe number of about 76.

The first freeform surface 1622 can be a $5^{th}$ order XY-polynomial curve surface. In some embodiments, an analytic form of the first freeform surface 1622 satisfies:

$$z(x, y) = \frac{c_1(x^2 + y^2)}{1 + \sqrt{1 - (1 + k)c_1^2(x^2 + y^2)}} + A_2 y + A_3 x^2 + A_5 y^2 + A_7 x^2 y +$$
$$A_9 y^3 + A_{10} x^4 + A_{12} x^2 y^2 + A_{14} y^4 + A_{16} x^4 y + A_{18} x^2 y^3 + A_{20} y^5,$$

wherein, $c_1$ is curvature; k is conic constant; $A_2$, $A_3$, $A_5$, $A_7$, $A_9$, $A_{10}$, $A_{12}$, $A_{14}$, $A_{16}$, $A_{18}$ and $A_{20}$ are coefficients. In one embodiment, values of the curvature $c_1$, conic constant k, and the coefficients $A_2$, $A_3$, $A_5$, $A_7$, $A_9$, $A_{10}$, $A_{12}$, $A_{14}$, $A_{16}$, $A_{18}$ and $A_{20}$ are listed in table 1.

TABLE 1

| | |
|---|---|
| $c_1$ | −0.00840342361559533 |
| k | −13.1593092531843 |
| $A_2$ | −5.52278890932116E−14 |
| $A_3$ | 2.96489354878911E−03 |
| $A_5$ | 2.91326939497068E−03 |
| $A_7$ | 4.76838525024617E−08 |
| $A_9$ | 7.82131155179962E−08 |
| $A_{10}$ | 6.19731744269913E−07 |
| $A_{12}$ | −1.27490547215523E−08 |
| $A_{14}$ | −1.79954964051450E−07 |
| $A_{16}$ | −2.11928233145496E−08 |
| $A_{18}$ | −8.66202887985918E−10 |
| $A_{20}$ | 9.97940014815302E−10 |

The second freeform surface 1624 can be a $5^{th}$ order XY-polynomial curve surface. In some embodiments, an analytic form of the second freeform surface 1624 satisfies:

$$z(x, y) = \frac{c_2(x^2 + y^2)}{1 + \sqrt{1 - (1 + k')c_2^2(x^2 + y^2)}} + A'_2 y + A'_3 x^2 + A'_5 y^2 + A'_7 x^2 y +$$
$$A'_9 y^3 + A'_{10} x^4 + A'_{12} x^2 y^2 + A'_{14} y^4 + A'_{16} x^4 y + A'_{18} x^2 y^3 + A'_{20} y^5,$$

wherein, $c_2$ is curvature; k' is conic constant; $A'_2$, $A'_3$, $A'_5$, $A'_7$, $A'_9$, $A'_{10}$, $A'_{12}$, $A'_{14}$, $A'_{16}$, $A'_{18}$ and $A'_{20}$ are coefficients. In one embodiment, values of the curvature $c_2$, conic constant k', and the coefficients $A'_2$, $A'_3$, $A'_5$, $A'_7$, $A'_9$, $A'_{10}$, $A'_{12}$, $A'_{14}$, $A'_{16}$, $A'_{18}$ and $A'_{20}$ are listed in table 2.

TABLE 2

| | |
|---|---|
| $c_2$ | −0.00840342361559533 |
| K' | −13.1593092531843 |
| $A'_2$ | 5.52278890932116E−14 |
| $A'_3$ | 2.96489354878911E−03 |
| $A'_5$ | 2.91326939497068E−03 |
| $A'_7$ | −4.76838525024617E−08 |
| $A'_9$ | −7.82131155179962E−08 |
| $A'_{10}$ | 6.19731744269923E−07 |
| $A'_{12}$ | −1.27490547215523E−08 |
| $A'_{14}$ | −1.79954964051450E−07 |
| $A'_{16}$ | 2.11928233145496E−08 |
| $A'_{18}$ | 8.66202887985918E−10 |
| $A'_{20}$ | −9.97940014815302E−10 |

The back surface 164 can be a $10^{th}$ order aspheric surface. In some embodiments, an analytic form of the back surface 164 satisfies:

$$z(x, y) = \frac{c_3(x^2 + y^2)}{1 + \sqrt{1 - (1 + k_1)c_3^2(x^2 + y^2)}} +$$
$$D(x^2 + y^2)^2 + E(x^2 + y^2)^3 + F(x^2 + y^2)^4 + G(x^2 + y^2)^5,$$

wherein, $c_3$ is curvature; $k_1$ is conic constant; D, E, F, and G are coefficients. In one embodiment, values of the curvature $c_3$, conic constant $k_1$, and the coefficients D, E, F, and G are listed in table 3.

TABLE 3

| | |
|---|---|
| $c_3$ | 0.00796808853571445 |
| $K_1$ | 0.637349059540081 |
| D | 1.42634797718698E−07 |
| E | −8.51981255927027E−12 |
| F | 9.81455629012912E−16 |
| G | −1.30179502542930E−19 |

The image sensing element 18 is located on a light path of the refracted light T, and is parallel to a x-y plane. An effective scanning range $R_3$ of the image sensing element 18 along the y-axis is greater than 420 millimeters. In one embodiment, the effective scanning range $R_3$ of the image sensing element 18 along the y-axis is about 420 millimeters.

Figure 3:
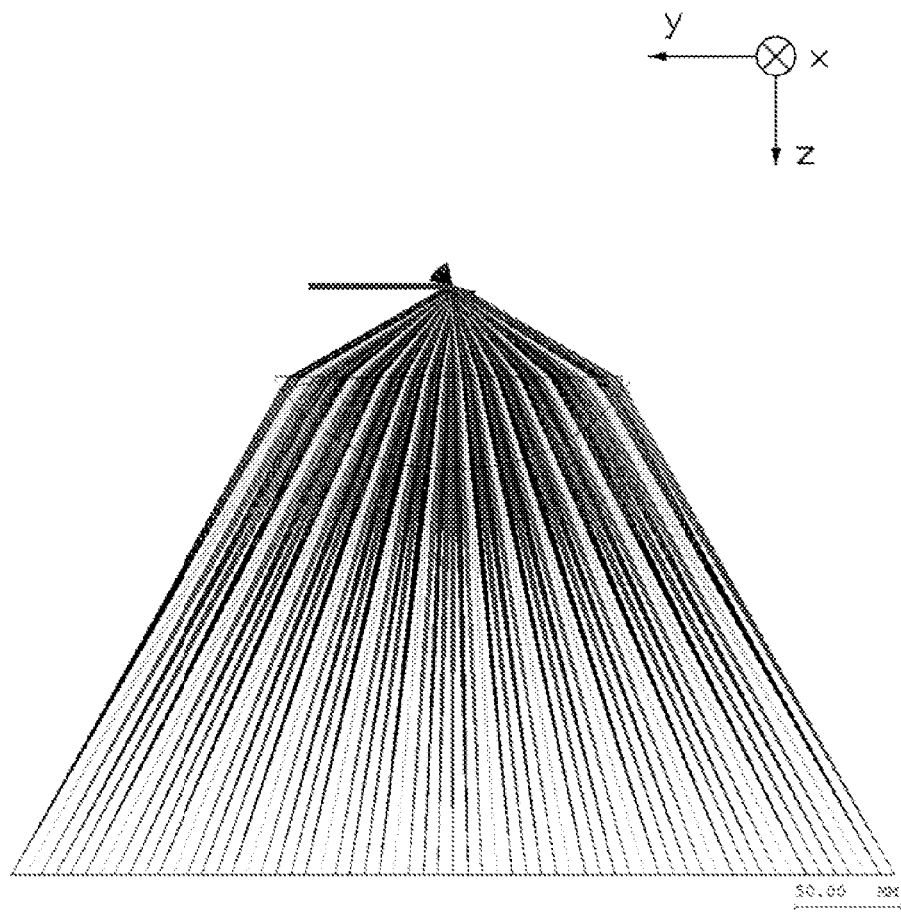
FIG. 3 shows an imaging result of the freeform imaging system.
Figure 4:
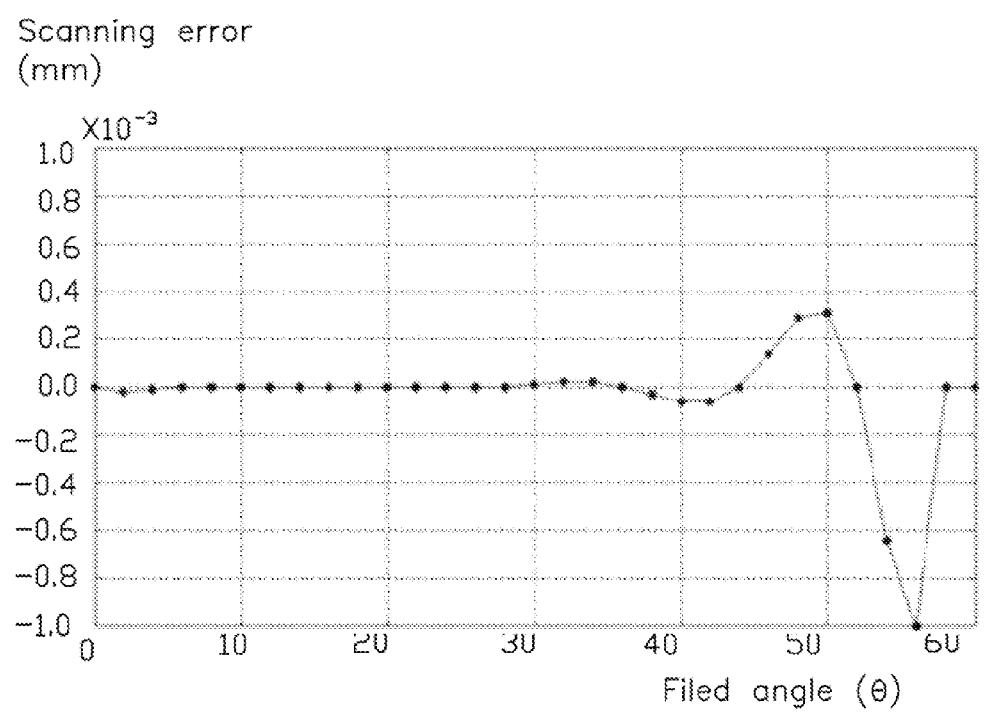
FIG. 4 shows a schematic view of one embodiment of a scanning error of the freeform imaging system.
Figure 5:
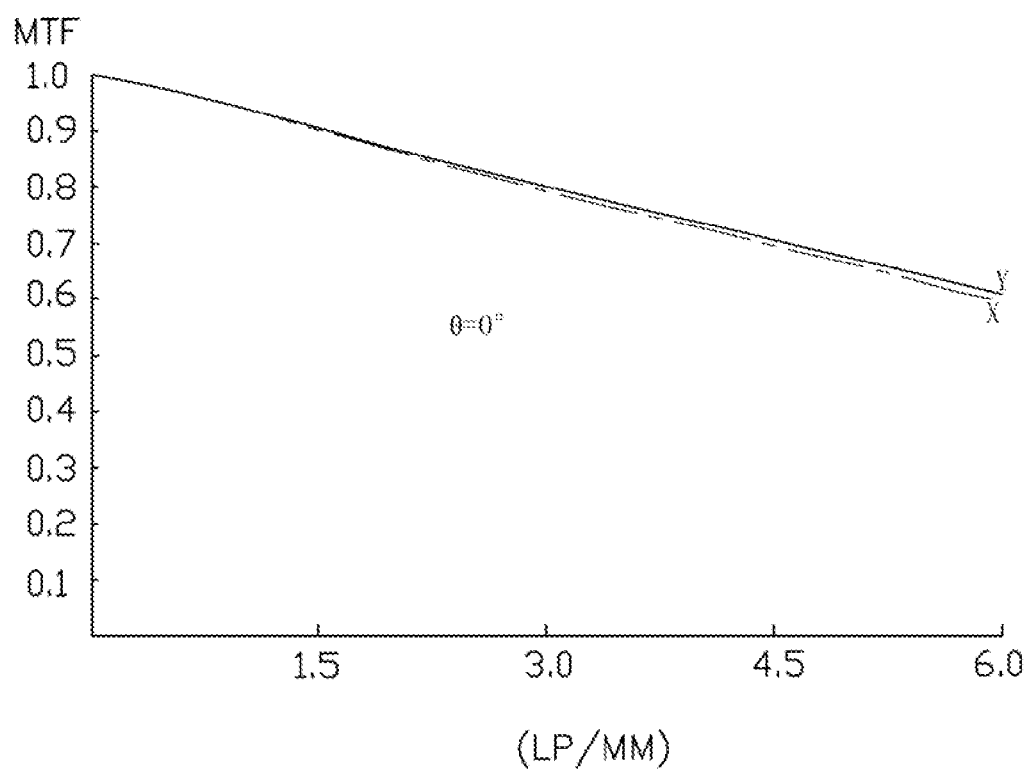
FIG. 5 shows a modulation transfer function (MTF) curve of one embodiment of the freeform imaging system with a field angle of 0 degree.
Figure 6:
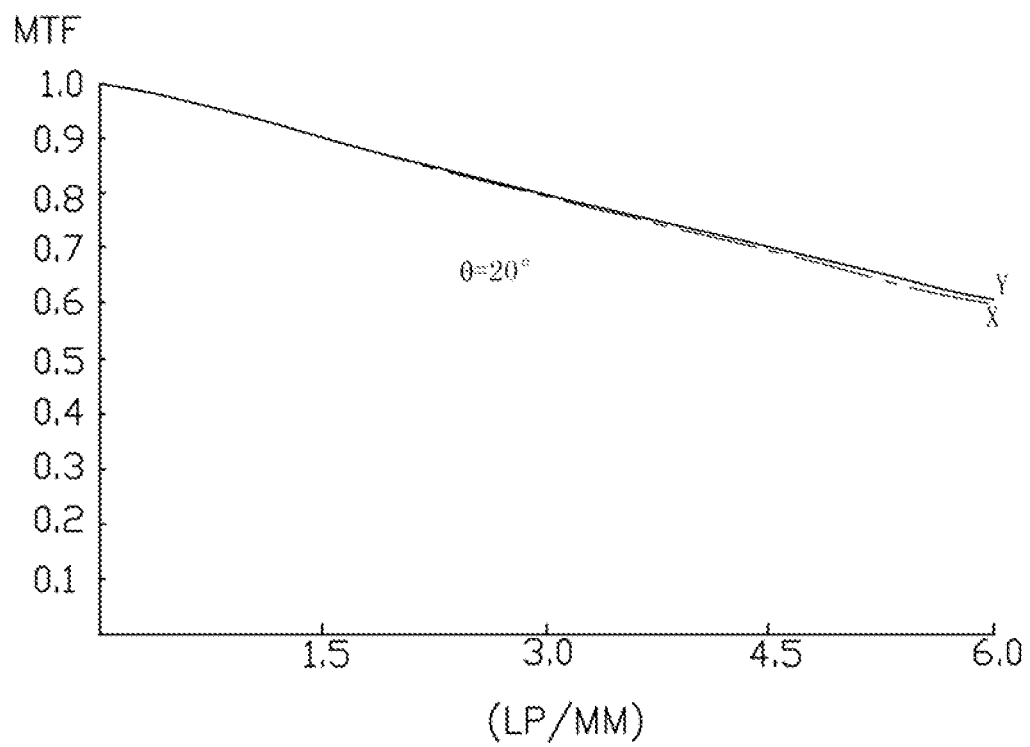
FIG. 6 shows a MTF curve of one embodiment of the freeform imaging system with a field angle of +20 degrees.
Figure 7:
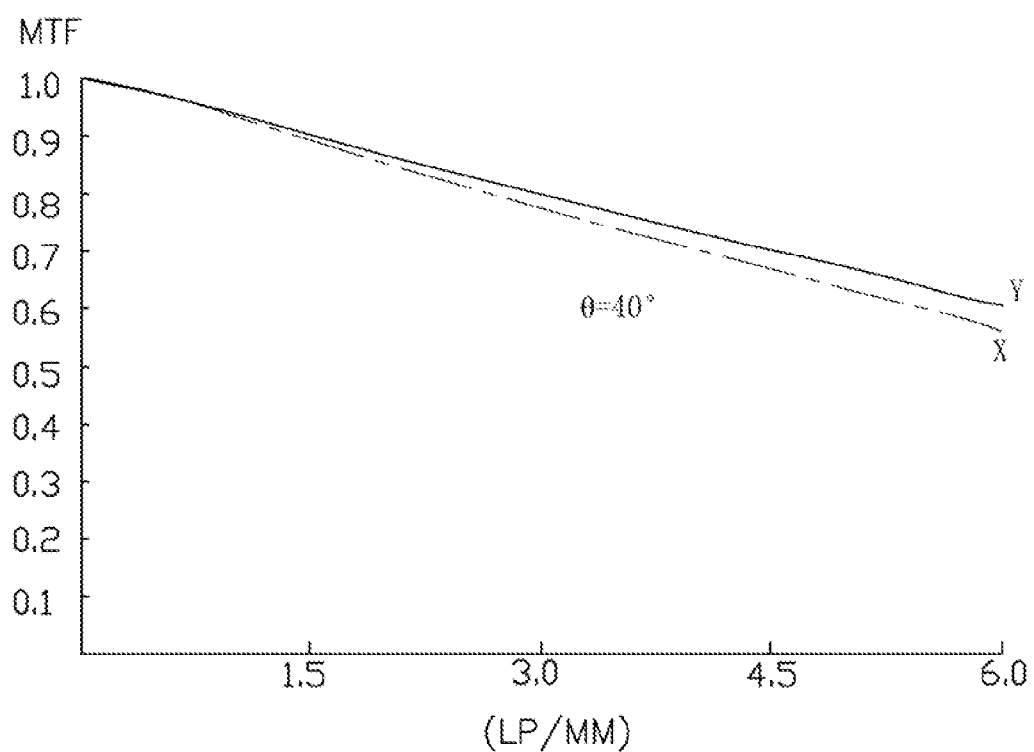
FIG. 7 shows a MTF curve of one embodiment of the freeform imaging system with a field angle of +40 degrees.
Figure 8:
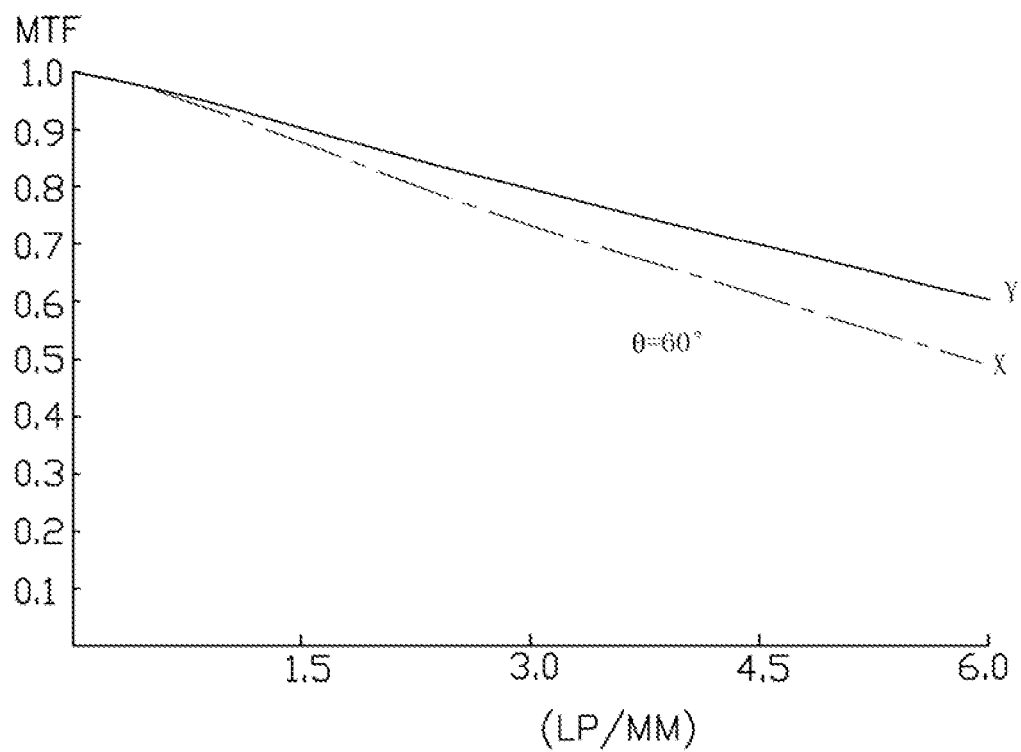
FIG. 8 shows a MTF curve of one embodiment of the freeform imaging system with a field angle of +60 degrees.

Referring to FIG. 3, when the reflector 14 revolves around the center $O_1$ from about 15 degrees to about 75 degrees, a linear scan with a filed angle θ from about −60 degrees to about +60 degrees can be achieved. Referring to FIG. 4, a scanning error of the filed angle θ from about −60 degrees to about 60 degrees on the image sensing element 18 is within ±1 micron. Referring to FIGS. 5-8, according to the MTF curves of the freeform imaging system 100, the freeform imaging system 100 with all filed angles can reach a diffraction limit. Thus, the freeform imaging system has a superior performance in imaging. Furthermore, the freeform imaging system comprises only one freeform imaging lens, and is easy to be assembled.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A freeform imaging lens, defined in a (x,y,z) coordinate, comprising:
   a first surface and a second surface opposite to the first surface, wherein the first surface comprises a first freeform surface and a second freeform surface that are symmetrical about an x-z plane, the first freeform surface and the second freeform surface are both $5^{th}$ order xy-polynomial curve surfaces, and the second surface is a $10^{th}$ order aspheric surface, wherein an analytic form of the first freeform surface satisfies:

$$z(x, y) = \frac{c_1(x^2 + y^2)}{1 + \sqrt{1 - (1 + k)c_1^2(x^2 + y^2)}} + A_2 y + A_3 x^2 + A_5 y^2 + A_7 x^2 y +$$
$$A_9 y^3 + A_{10} x^4 + A_{12} x^2 y^2 + A_{14} y^4 + A_{16} x^4 y + A_{18} x^2 y^3 + A_{20} y^5,$$

wherein, $c_1$ is curvature of the first freeform surface; k is a conic constant; $A_2$, $A_3$, $A_5$, $A_7$, $A_9$, $A_{10}$, $A_{12}$, $A_{14}$, $A_{16}$, $A_{18}$ and $A_{20}$ are coefficients.

2. The freeform imaging lens of claim 1, wherein values of the curvature $c_1$, the conic constant k, and the coefficients $A_2, A_3, A_5, A_7, A_9, A_{10}, A_{12}, A_{14}, A_{16}, A_{18}$ $A_{20}$ are listed as following:

| | |
|---|---|
| $c_1$ | −0.00840342361559533 |
| k | −13.1593092531843 |
| $A_2$ | −5.52278890932116E−14 |
| $A_3$ | 2.96489354878911E−03 |
| $A_5$ | 2.91326939497068E−03 |
| $A_7$ | 4.76838525024617E−08 |
| $A_9$ | 7.82831155179962E−08 |
| $A_{10}$ | 6.19731744269923E−07 |
| $A_{12}$ | −1.27490547215523E−08 |
| $A_{14}$ | −1.79954964051450E−07 |
| $A_{16}$ | −2.11928233145496E−08 |
| $A_{18}$ | −8.66202887985918E−10 |
| $A_{20}$ | 9.97940014815302E−10. |

3. The freeform imaging lens of claim 1, wherein an analytic form of the second freeform surface satisfies:

$$z(x, y) = \frac{c_2(x^2 + y^2)}{1 + \sqrt{1 - (1 + k')c_2^2(x^2 + y^2)}} + A'_2 y + A'_3 x^2 + A'_5 y^2 + A'_7 x^2 y +$$
$$A'_9 y^3 + A'_{10} x^4 + A'_{12} x^2 y^2 + A'_{14} y^4 + A'_{16} x^4 y + A'_{18} x^2 y^3 + A'_{20} y^5,$$

wherein, $c_2$ is curvature; k' is conic constant; $A'_2, A'_3, A'_5, A'_7, A'_9, A'_{10}, A'_{12}, A'_{14}, A'_{16}, A'_{18}$ and $A'_{20}$ are coefficients.

4. The freeform imaging lens of claim 3, wherein values of the curvature $c_2$, conic constant k', and the coefficients $A'_2, A'_3, A'_5, A'_7, A'_9, A'_{10}, A'_{12}, A'_{14}, A'_{16}, A'_{18}$ and $A'_{20}$ are listed as following:

| | |
|---|---|
| $c_2$ | −0.00840342361559533 |
| K' | −13.1593092531843 |
| $A'_2$ | 5.52278890932116E−14 |
| $A'_3$ | 2.96489354878911E−03 |
| $A'_5$ | 2.91326939497068E−03 |
| $A'_7$ | −4.76838525024617E−08 |
| $A'_9$ | −7.82131155179962E−08 |
| $A'_{10}$ | 6.19731744269923E−07 |
| $A'_{12}$ | −1.27490547215523E−08 |
| $A'_{14}$ | −1.79954964051450E−07 |
| $A'_{16}$ | 2.11928233145496E−08 |
| $A'_{18}$ | 8.66202887985918E−10 |
| $A'_{20}$ | −9.97940014815302E−10. |

5. The freeform imaging lens of claim 1, wherein an analytic form of the second surface satisfies:

$$z(x, y) = \frac{c_1(x^2 + y^2)}{1 + \sqrt{1 - (1 + k_1)c_1^2(x^2 + y^2)}} +$$
$$D(x^2 + y^2)^2 + E(x^2 + y^2)^3 + F(x^2 + y^2)^4 + G(x^2 + y^2)^5,$$

wherein, $c_3$ is curvature; $k_1$ is conic constant; D, E, F, and G are coefficients.

6. The freeform imaging lens of claim 5, wherein values of the curvature $c_3$, conic constant $k_1$, and the coefficients D, E, F, G are listed as following:

| | |
|---|---|
| $c_3$ | 0.00796808853571445 |
| $K_1$ | 0.637349059540081 |
| D | 1.42634797718698E−07 |
| E | −8.51981255927027E−12 |
| F | 9.81455629012912E−16 |
| G | −1.30179502542930E−19. |

7. A freeform imaging system, defined in a (x, y, z) coordinate, comprising:
a light source outputting a laser along a y-axis;
an entrance pupil located on a light path of the laser;
a reflector perpendicular to a y-z plane located on a side of the entrance pupil opposite to the light source and configured to reflect the laser to form a reflected light in the y-z plane, wherein the reflector has a center and is capable of revolve around the center;
a freeform imaging lens located on a light path of the reflected light comprising a front surface and a back surface opposite to the front surface, wherein the reflected light is refracted by the freeform imaging lens to form a refracted light, the front surface comprises a first freeform surface and a second freeform surface that are symmetrical about an x-z plane, the first freeform surface and the second freeform surface are both $5^{th}$ order xy-polynomial curve surfaces, and the back surface is a $10^{th}$ order aspheric surface; and
an image sensing element, parallel to a x-y plane, located on a light path of the refracted light, wherein an analytic form of the first freeform surface satisfies:

$$z(x, y) = \frac{c_1(x^2 + y^2)}{1 + \sqrt{1 - (1 + k)c_1^2(x^2 + y^2)}} + A_2 y + A_3 x^2 + A_5 y^2 + A_7 x^2 y +$$
$$A_9 y^3 + A_{10} x^4 + A_{12} x^2 y^2 + A_{14} y^4 + A_{16} x^4 y + A_{18} x^2 y^3 + A_{20} y^5,$$

wherein, $c_1$ is curvature; k is conic constant; $A_2, A_3, A_5, A_7, A_9, A_{10}, A_{12}, A_{14}, A_{16}, A_{18}$ and $A_{20}$ are coefficients.

8. The freeform imaging system of claim 7, wherein values of the curvature $c_1$, the conic constant k, and the coefficients $A_2, A_3, A_5, A_7, A_9, A_{10}, A_{12}, A_{14}, A_{16}, A_{18}$ $A_{20}$ are listed as following:

| | |
|---|---|
| $c_1$ | −0.00840342361559533 |
| k | −13.1593092531843 |
| $A_2$ | −5.52278890932116E−14 |
| $A_3$ | 2.96489354878911E−03 |
| $A_5$ | 2.91326939497068E−03 |
| $A_7$ | 4.76838525024617E−08 |
| $A_9$ | 7.82131155179962E−08 |
| $A_{10}$ | 6.19731711269923E−07 |
| $A_{12}$ | −1.27490547215523E−08 |
| $A_{14}$ | −1.79954964051450E−07 |
| $A_{16}$ | −2.11928233145496E−08 |
| $A_{18}$ | −8.66202887985918E−10 |
| $A_{20}$ | 9.97940014815302E−10. |

9. The freeform imaging system of claim 7, wherein an analytic form of the second freeform surface satisfies:

$$z(x, y) = \frac{c_2(x^2 + y^2)}{1 + \sqrt{1 - (1 + k')c_2^2(x^2 + y^2)}} + A'_2 y + A'_3 x^2 + A'_5 y^2 + A'_7 x^2 y +$$
$$A'_9 y^3 + A'_{10} x^4 + A'_{12} x^2 y^2 + A'_{14} y^4 + A'_{16} x^4 y + A'_{18} x^2 y^3 + A'_{20} y^5,$$

wherein, $c_2$ is curvature; k' is conic constant; $A'_2$, $A'_3$, $A'_5$, $A'_7$, $A'_9$, $A'_{10}$, $A'_{12}$, $A'_{14}$, $A'_{16}$, $A'_{18}$ and $A'_{20}$ are coefficients.

10. The freeform imaging system of claim 9, wherein values of the curvature $c_2$, conic constant k', and the coefficients $A'_2$, $A'_3$, $A'_5$, $A'_7$, $A'_9$, $A'_{10}$, $A'_{12}$, $A'_{14}$, $A'_{16}$, $A'_{18}$ and $A'_{20}$ are listed as following:

| | |
|---|---|
| $c_2$ | −0.00840342361559533 |
| K' | −13.1593092531843 |
| $A'_2$ | 5.52278890932116E−14 |
| $A'_3$ | 2.96489354878911E−03 |
| $A'_5$ | 2.91326939497068E−03 |
| $A'_7$ | −4.76838525024617E−08 |
| $A'_9$ | −7.82131155179962E−08 |
| $A'_{10}$ | 6.19731744269923E−07 |
| $A'_{12}$ | −1.27490547215523E−08 |
| $A'_{14}$ | −1.79954961051450E−07 |
| $A'_{16}$ | 2.11928233145496E−08 |
| $A'_{18}$ | 8.66202887985918E−10 |
| $A'_{20}$ | −9.97940014815302E−10. |

11. The freeform imaging system of claim 7, wherein an analytic form of the back surface satisfies:

$$z(x, y) = \frac{c_1(x^2 + y^2)}{1 + \sqrt{1 - (1 + k_1)c_1^2(x^2 + y^2)}} + D(x^2 + y^2)^2 + E(x^2 + y^2)^3 + F(x^2 + y^2)^4 + G(x^2 + y^2)^5,$$

wherein, $c_3$ is curvature; $k_1$ is conic constant; D, E, F, and G are coefficients.

12. The freeform imaging system of claim 11, wherein values of the curvature $c_3$, conic constant $k_1$, and the coefficients D, E, F, G are listed as following:

| | |
|---|---|
| $c_3$ | 0.00796808853571445 |
| $K_1$ | 0.637349059540081 |
| D | 1.42634797718698E−07 |
| E | −8.51981255927027E−12 |
| F | 9.81455629012912E−16 |
| G | −1.30179502542930E−19. |

13. The freeform imaging system of claim 7, wherein an angle α formed between the reflector and the y-axis is in a range from about 15 degrees to about 75 degrees.

14. The freeform imaging system of claim 7, wherein a width of the laser with a wavelength of about 780 nanometers is about 3 millimeters.

15. The freeform imaging system of claim 7, wherein a material of the freeform imaging lens is PMMA with a refractive index of about 1.4917 and an Abbe number of about 76.

16. The freeform imaging system of claim 7, wherein a filed angle of the freeform imaging system ranges from about −60 degrees to about +60 degrees.

* * * * *